(12) United States Patent
Koike et al.

(10) Patent No.: US 6,834,231 B2
(45) Date of Patent: Dec. 21, 2004

(54) VEHICLE TRAVEL CONTROL SYSTEM

(75) Inventors: Hiroyuki Koike, Saitama (JP);
Kazuhiko Mochizuki, Saitama (JP);
Yoshihiro Urai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/304,004

(22) Filed: Nov. 26, 2002

(65) Prior Publication Data

US 2003/0158666 A1 Aug. 21, 2003

(30) Foreign Application Priority Data

Dec. 5, 2001 (JP) .................................. 2001-370899
Aug. 7, 2002 (JP) .................................. 2002-229681

(51) Int. Cl.[7] .............................................. G06F 17/00
(52) U.S. Cl. .................... 701/301; 340/436; 340/903
(58) Field of Search .................... 701/96, 300, 301; 342/450, 455; 340/436, 903

(56) References Cited

U.S. PATENT DOCUMENTS

| | | | | |
|---|---|---|---|---|
| 5,745,870 A | * | 4/1998 | Yamamoto et al. | 701/301 |
| 5,761,630 A | * | 6/1998 | Sekine et al. | 701/301 |
| 6,496,770 B2 | * | 12/2002 | Winner et al. | 701/96 |
| 6,665,614 B2 | * | 12/2003 | Sekiguchi | 701/301 |
| 2003/0156015 A1 | * | 8/2003 | Winner et al. | 340/425.5 |
| 2003/0218564 A1 | * | 11/2003 | Tamatsu et al. | 342/70 |
| 2004/0064241 A1 | * | 4/2004 | Sekiguchi | 701/96 |

FOREIGN PATENT DOCUMENTS

JP 8-240660 9/1996

* cited by examiner

*Primary Examiner*—Gary Chin
(74) *Attorney, Agent, or Firm*—Arent Fox PLLC

(57) ABSTRACT

A vehicle travel control system wherein a plurality of objects ahead of a subject vehicle are detected by a radar system. Data corresponding to the plurality of objects within a predetermined region is united into a target object corresponding to a large-sized vehicle. If one of the objects is in a region spaced forward a predetermined distance from a representative position of the target object, which is spaced leftwards in a direction toward at an estimated locus at a predetermined distance apart from a left end point of the representative position, which is spaced forward at a predetermined distance from the subject vehicle and which is included in the estimated locus of the subject vehicle, one of the objects is separated as a target object corresponding to a small-sized vehicle from the original target object to control the traveling of the subject vehicle relative to the small-sized vehicle within the estimated locus.

18 Claims, 8 Drawing Sheets

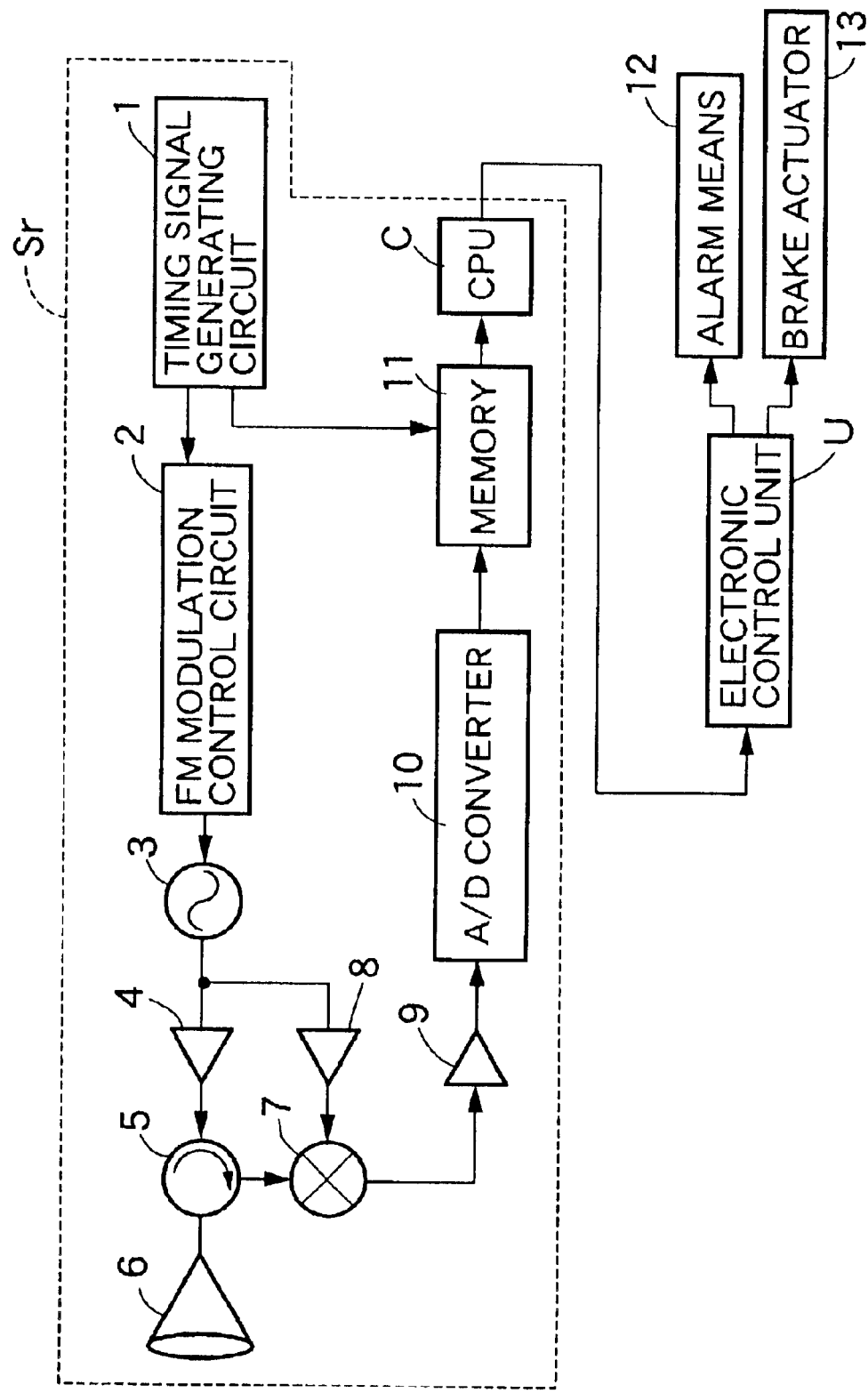

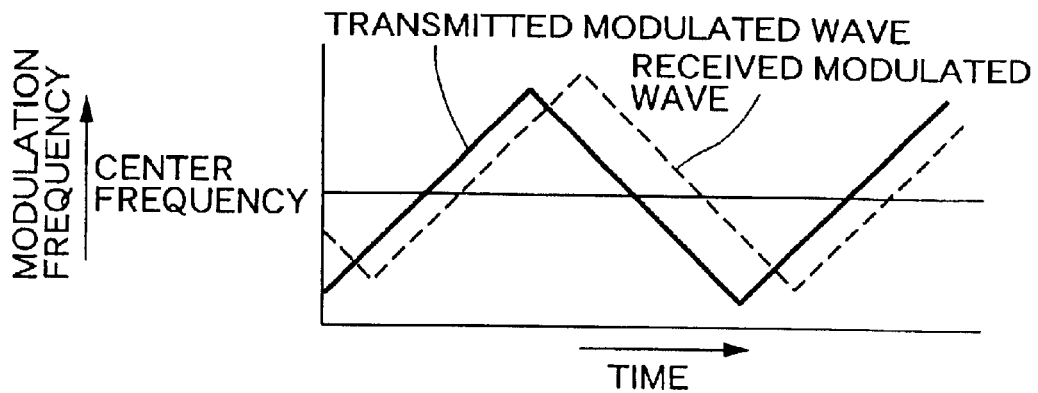
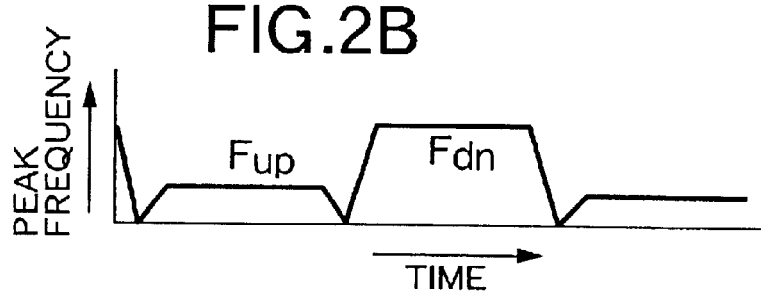
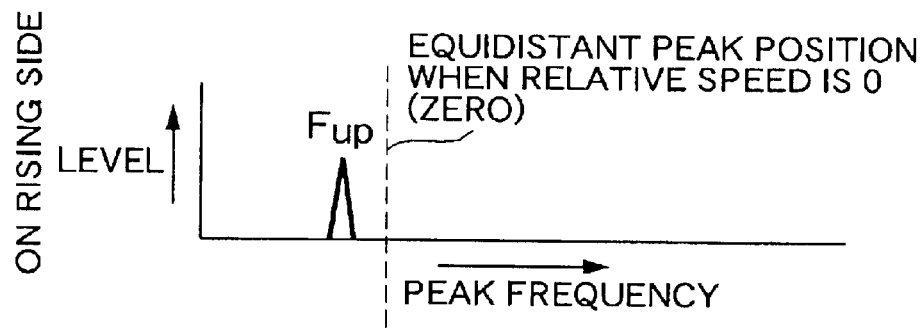
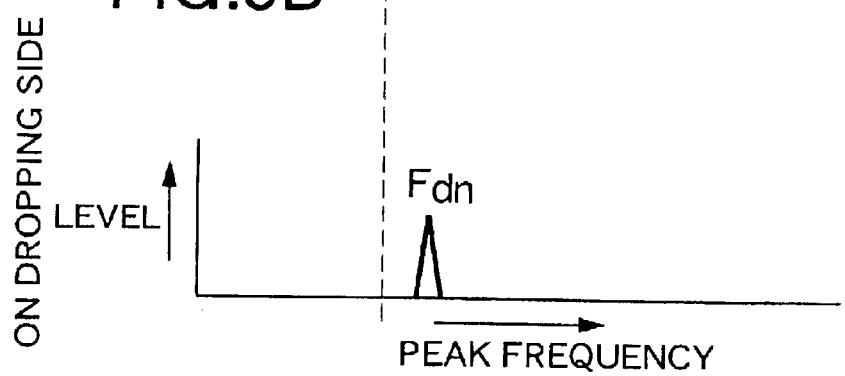

VEHICLE TRAVEL CONTROL SYSTEM

BACKGROUND OF THE INVENTION

1. Field of the Invention

The present invention relates to a vehicle travel control system adapted to detect an object within an estimated locus of a subject vehicle and to control the travel state of the subject vehicle in accordance with the positional relationship between the object and the subject vehicle.

2. Description of the Related Art

A conventional object recognizing process is known from Japanese Patent Application Laid-open No.8-240660, which distinguishes a moving object, such as a preceding vehicle, from a stationary object, such as a guard rail, by merging data from select objects of a plurality of objects detected by a radar system mounted on a subject vehicle. The positions of the select objects are closer to one another and the traveling speeds of the select objects relative to the subject vehicle have a variation within a predetermined range.

When a small-sized vehicle, such as an automobile, is traveling ahead of a subject vehicle and a large-sized vehicle, such as a carrier car, is traveling side by side with the small-sized vehicle, there is a possibility in the conventional object recognizing process that the respective data for the small-sized vehicle and the large-sized vehicle are merged and the two vehicles are misrecognized as a single vehicle. In such a case, the position of both vehicles is recognized by the conventional object recognizing process as the position of the large-sized vehicle because of a difference between the body size of each vehicle. It follows that the small-sized vehicle, traveling within an estimated locus of the subject vehicle, is not recognized and only the large-sized vehicle, traveling outside the estimated locus of the subject vehicle, is recognized. As a result, when the subject vehicle approaches both vehicles or the large-sized vehicle changes its travelling course so that the large-sized vehicle deviates from a range detectable by the radar system, the merged data for the small-sized and large-sized vehicles is separated and the small-sized vehicle is suddenly recognized within the estimated locus of the subject vehicle. As a result, there is a possibility that the braking ability of the subject vehicle to prevent a collision between the subject vehicle and a preceding vehicle is retarded.

SUMMARY OF THE INVENTION

It is an object of the present invention to overcome the above-described conventional object recognizing process.

It is also an object of the present invention to ensure that data for a plurality of objects in front of the subject vehicle are prevented from being inappropriately merged, so that control of the vehicle is properly executed.

To achieve at least the above objects, according to a feature of the present invention, there is provided a travel control system for a vehicle, including a transmitting/receiving means that transmits an electromagnetic wave toward a predetermined region in a direction of traveling of a subject vehicle and receives a wave reflected from an object within the predetermined region. An object information calculating means calculates a position of the object relative to the subject vehicle based on the results of wave transmission and reception by the transmitting/receiving means. A uniting means unites a plurality of objects into one target object based on at least the positions of the plurality of objects when the plurality of objects are detected within the predetermined region. A locus estimating means estimates a future travel locus for the subject vehicle. A vehicle control means controls the traveling state of the subject vehicle in accordance with the positional relationship between the target object and the subject vehicle when the target object united by the uniting means is within the estimated locus. The travel control system further including a separating means for separating the target object into separate (i.e., different)target objects that are inside and outside the locus estimated for the subject vehicle by the locus estimating means when the plurality of objects united by the uniting means are inside and outside the estimated locus of the subject vehicle.

With the above arrangement, when the plurality of objects detected by the transmitting/receiving means are united into a single target object, if the plurality of objects united into the single target object are inside and outside the estimated locus of the subject vehicle, the single target object is separated into separate target objects that are inside and outside the estimated locus of the subject vehicle. Therefore, target objects erroneously united into a single target object can accurately be recognized as separate objects, thereby properly executing control of the subject vehicle based on the positional relationship between the target objects within the estimated locus and the subject vehicle.

According to another feature of the present invention, the uniting means unites a plurality of objects within a predetermined region that is established based on one of the plurality of objects.

With the above arrangement, the objects within the predetermined region are detected and a plurality of objects that are originally separate are prevented from being united into a single target object.

According to additional features of the present invention, the travel control system further includes a position outputting means for outputting a representative position of the single target object united by the uniting means on the basis of the position of an object existing in a smaller region established in the predetermined region at a location closer to the subject vehicle.

With the above arrangement, the smaller region is established within the predetermined region at a location closer to the subject vehicle and the representative position of the target object based on the position of the object within the smaller region. Therefore, the representative position of the target object is established at a point that is as close as possible to the subject vehicle.

According to additional features of the present invention, when a plurality of objects exist in the smaller region, the position outputting means outputs a position that is central relative to the positions of two objects that are located at laterally opposite ends of the smaller region as the representative position.

With the above arrangement, the position central to the positions of the two laterally opposite objects within the smaller region is output as the representative position of the target object. Thus, the position of the target object is appropriately determined by the representative position.

According to yet more features of the present invention, when at least one of the plurality of objects is within the predetermined region that does not include the smaller region and is within the estimated locus, the separating means separates the one object as a target object.

With the above arrangement, a different target object is separated from the original target object once united on a condition that the separated different target object is within the predetermined region that does not include the smaller region. Therefore, different target objects, which are not required to be separated, are prevented from being separated from the original target object.

According to additional features of the present invention, the separating means separates, as a target object, an object located at a distance equal to or larger than a first predetermined distance toward the estimated locus on the basis of one of the objects original to output the representative position, which is closest to the estimated locus.

With the above arrangement, the object existing at the distance equal to or larger than the first predetermined distance toward the estimated locus on the basis of one of the objects existing in the smaller region is separated as a different target object from the original target object. Therefore, the separating of target objects, which are not required to be separated from the original target object, can be prevented from being carried out by mistake.

An exemplary first predetermined distance is set at 0.8 m in embodiments, but it is within the scope of the invention that the distance may be set at any value.

According to additional features of the present invention, the travel control system includes, in place of the separating means, a re-separating means which is adapted, when two or more of the plurality of objects united by the uniting means exist within the estimated locus, to re-separate (or separate again) the objects spaced at a lateral distance equal to or larger than a second predetermined lateral distance apart from each other as a different target object.

With the above arrangement, if the lateral distance between the two or more objects to be separated as the different target object from the original target object due to the existence of the objects within the estimated locus is equal to or larger than the second predetermined distance, the two or more objects are re-separated or separated again as the different target object. Therefore, the object existing on the estimated locus of the subject vehicle can be separated further reliably as the target object.

An exemplary second predetermined distance is set at 0.8 m in the embodiments, but it is within the scope of the invention that the distance may be set at any value.

According to yet more features of the present invention, the travel control system includes, in place of the separating means, a re-separating means which is adapted, when two or more of the plurality of objects united by the uniting means exist within the estimated locus, to re-separate the objects spaced at a longitudinal distance equal to or larger than a third predetermined distance apart from each other as a different target object.

With the above arrangement, if the longitudinal distance between the two or more objects to be separated as the different target object from the original target object due to the existence of them within the estimated locus is equal to or larger than the third predetermined distance, the two or more objects are re-separated as the different target object. Therefore, only objects required to be separated as a different target object can be reliably separated further.

An exemplary third predetermined distance is set at 3.0 m in the embodiments, but it is within the scope of the invention that the distance may be set at any value.

Also, the herein described millimeter-wave radar system in the embodiments may include and correspond to the transmitting/receiving means of the present invention.

The above and other objects, features and advantages of the invention will become apparent from the following description of the preferred embodiment taken in conjunction with the accompanying drawings.

BRIEF DESCRIPTION OF THE DRAWINGS

FIG. 1 is a block diagram illustrating the travel control system according to a first embodiment of the present invention;

FIGS. 2A–2B are graphs illustrating the waveforms of waves transmitted and received during movement of an object toward a transmitting/receiving antenna;

FIGS. 3A–3B are graphs illustrating detected peak signals;

DESCRIPTION OF THE PREFERRED EMBODIMENTS

Figure 4:
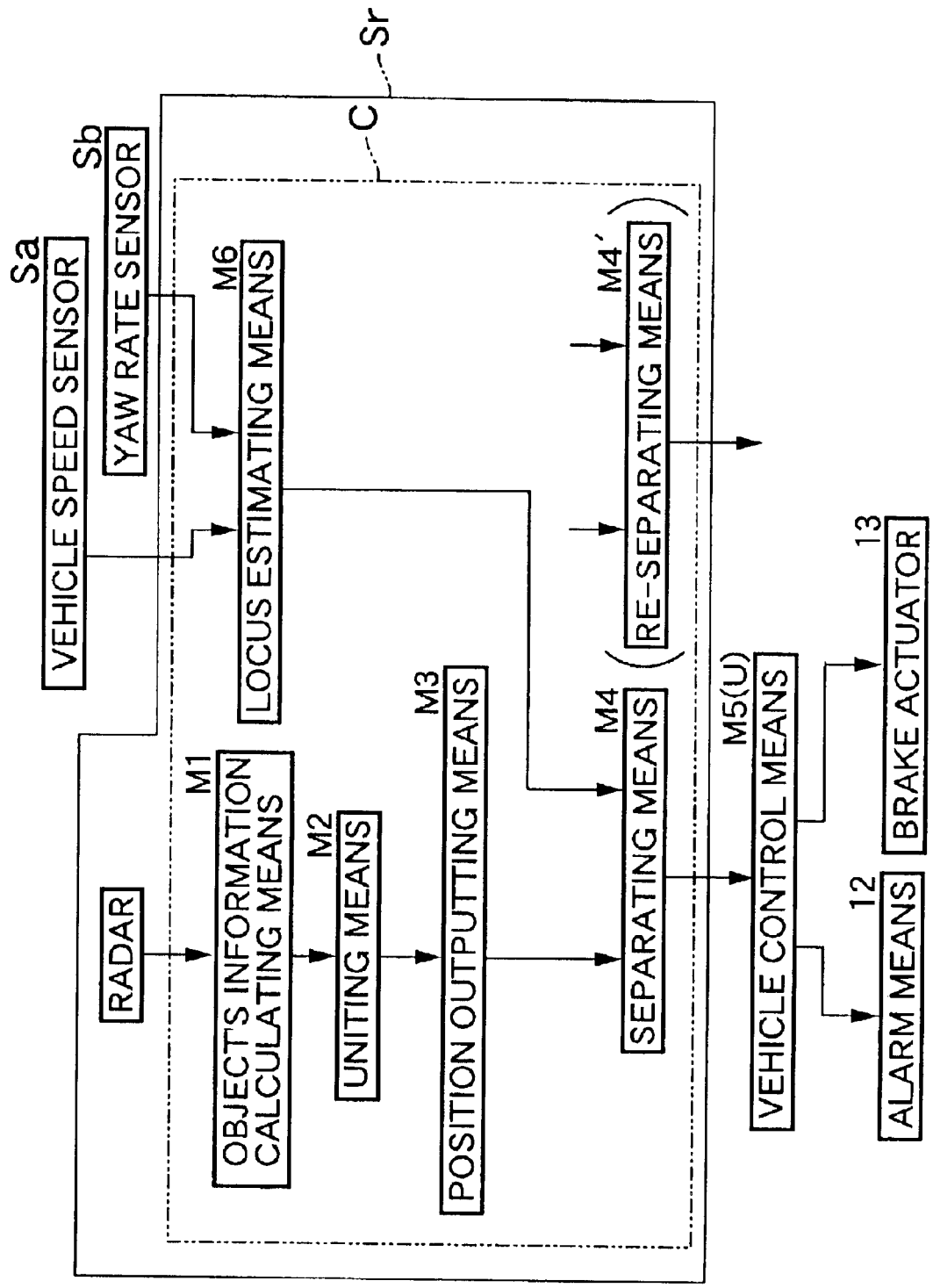
FIG. 4 is a block diagram illustrating a circuit arrangement of a radar system computing unit.

The preferred embodiments of the present invention will now be described by way of reference to the accompanying drawings.

Referring to FIG. 1, in a millimeter-wave radar system Sr using an FM-CW millimeter wave, the transmission operation of a transmitter 3 is modulation-controlled by an FM modulation control circuit 2 based on a timing signal input from a timing signal generating circuit 1. Thus, a transmitted signal having a frequency modulated into a triangular waveform, as shown in an upper section of FIG. 2A, is transmitted, for example, in the form of nine channels in horizontally different directions in a predetermined detection range forward of a vehicle from a transmitting/receiving antenna 6 through an amplifier 4 and a circulator 5. A wave resulting from the reflection of the FM-CW wave from an object, such as a vehicle traveling ahead of the subject vehicle (which will be referred to hereinafter as a preceding vehicle), is received by a transmitting/receiving antenna 6. For example, when the object is approaching the subject vehicle, the received wave appears following the transmitted wave with a frequency lower than that of the transmitted wave in a rising side where the frequency of the transmitted wave is increased rectilinearly, or appears, following the transmitted wave, with a frequency higher than that of the transmitted wave in a dropping side where the frequency of the transmitted wave is decreased rectilinearly. See the broken line in the upper section of FIG. 2A.

The wave received by the transmitting/receiving antenna 6 is input into a mixer 7 through the circulator 5. A transmitted wave dispensed from a transmitted wave output from the transmitter 3 in addition to a received wave from the circulator 5 is input into the mixer 7 through an amplifier 8. The transmitted wave and the received wave are mixed in the mixer 7 to produce a beat signal having a peak frequency Fup in a rising side where the frequency of the transmitted wave is increased rectilinearly and a peak frequency Fdn in a dropping side where the frequency of the transmitted wave is decreased rectilinearly. See FIG. 2B.

The beat signal provided in the mixer 7 is amplified to an amplitude level required by an amplifier 9 and then converted from analog to digital data by an A/D converter per every sampling time. The digital data is stored and retained in a time series manner in a memory 11. A timing signal has been input into the memory 11 from the timing signal generating circuit 1 and the memory 11 stores and retains the data in every rising side where the frequencies of the transmitted and received waves are increased and in every dropping side where such frequencies are decreased in accordance with the timing signal.

As shown in FIG. 4, a central processing unit (CPU) C calculates a relative distance and a relative speed relative to the object based on the data stored in the memory 11. The central processing unit (CPU)communicates the relative distance and relative speed to an electronic control unit U. The central processing unit (CPU) C includes an object's information calculating means M1, a uniting means M2, a position outputting means M3, a separating means M4 and a locus estimating means M6. A vehicle control means M5, which includes the electronic control unit U, receives a signal from the central processing unit (CPU) C to control operation of an alarm means 12 that signals a driver to spontaneously decelerate and the operation of a brake actuator 13 to drive a wheel brake of the subject vehicle.

The object's information calculating means M1 is adapted to analyze the frequency of the beat signal data stored in the memory 11 by a fast Fourier transform (FFT) to determine a spectral distribution and to detect a spectrum (also referred to as a peak signal) assuming a maximum value when the detection level is equal to or larger than a predetermined threshold value based on the spectral data. A peak signal on a rising side shown in an upper section of FIG. 3A and a peak signal on a dropping side shown in a lower section of FIG. 3B are symmetrically detected on opposite sides of a peak position at the time when the speed relative to the object is "0". Then, a relative distance and a relative speed relative to the object are calculated based on the peak frequency Fup on the rising side and the peak frequency Fdn on the dropping side. More specifically, a distance to the object is calculated based on a sum of the peak frequencies Fup and Fdn, and a speed relative to the object is calculated based on a difference between the peak frequencies Fup and Fdn. In addition, a direction of the object is calculated based on a direction of transmission of the transmitted wave at the time when the object is detected.

The uniting means M2 unites a plurality of objects by regarding them as one target object based on the position of the object (i.e., the relative distance and direction) provided in the object's information calculating means M1. The position-outputting means M3 outputs a position representative of the target objects united into one object. The locus estimating means M6 estimates a future locus of the subject vehicle based on a speed of the subject vehicle detected by the vehicle speed sensor Sa and a yaw rate detected by a yaw rate sensor Sb. The separating means M4 separates a target object into a plurality of objects based on a result of a comparison of the positions of the individual objects that form the target object with the estimated locus. The vehicle control means M5 includes, for example, a contact-damage alleviation aiding system and operates the alarm means 12 that signals the driver to perform a spontaneous braking operation, or operates the brake actuator 13 to conduct an automatic braking operation, so that the subject vehicle is either prevented from colliding with or at least forcefully contacting a preceding vehicle (namely, a target object), or alleviates any damage in case the vehicle does collide or otherwise contact the preceding vehicle.

The operation of the central processing unit (CPU)C will be described in further detail.

Figure 5:
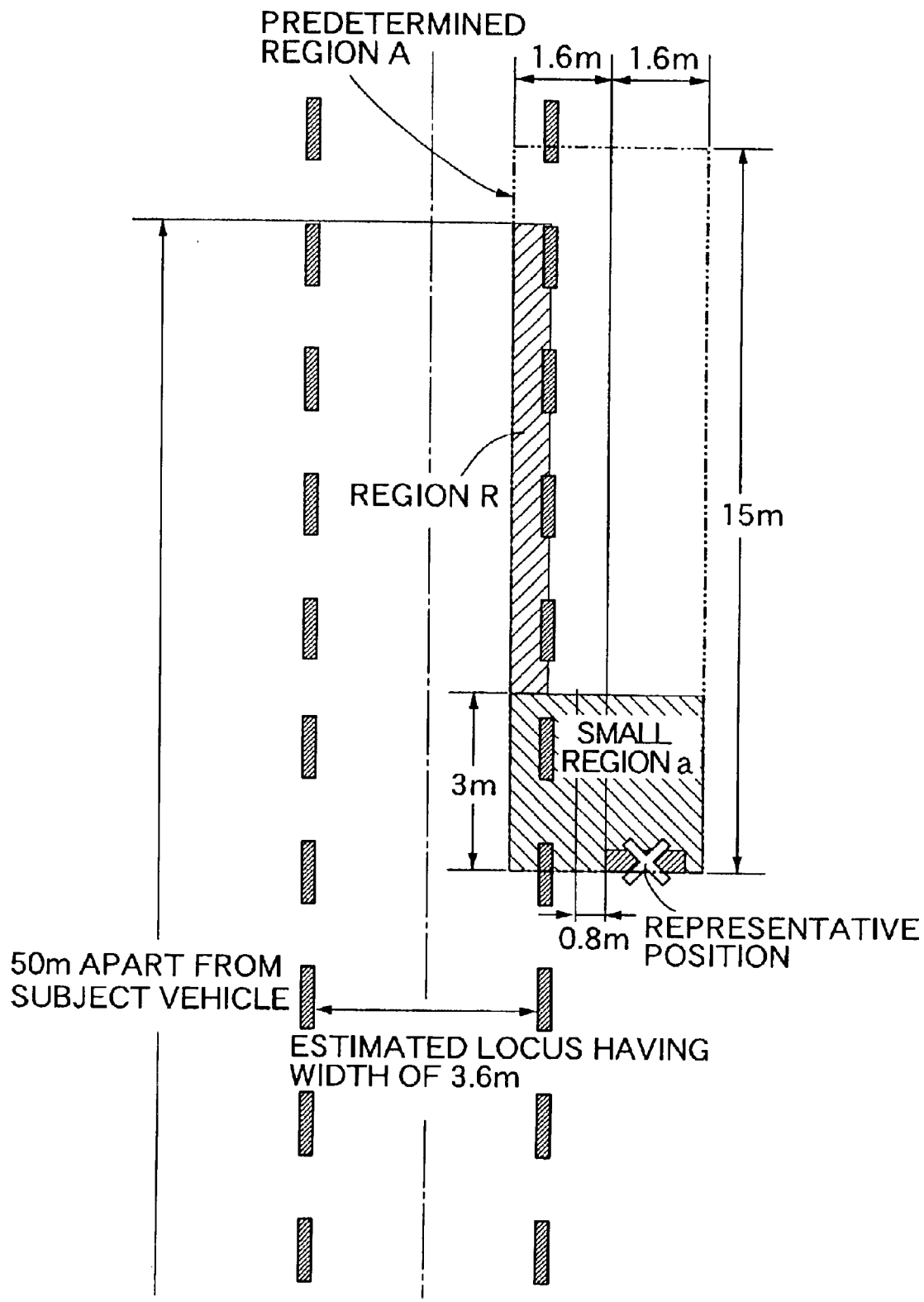
FIG. 5 is a schematic diagram illustrating a region in which a target vehicle is separated.
Figure 6:
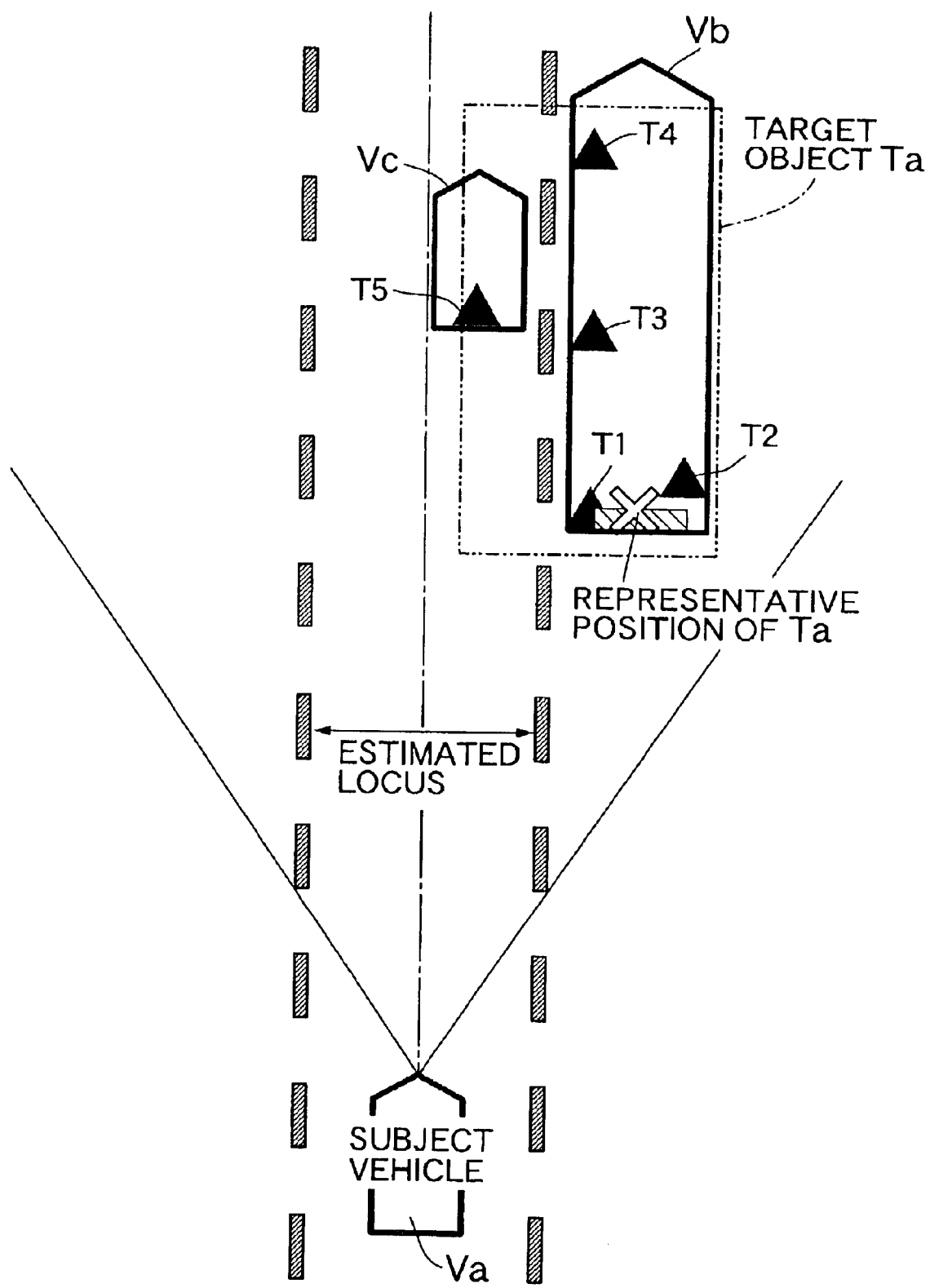
FIG. 6 is a schematic diagram illustrating a state in which a large-sized vehicle and a small-sized vehicle traveling side by side in front of a subject vehicle are united into a single target vehicle.
Figure 7:
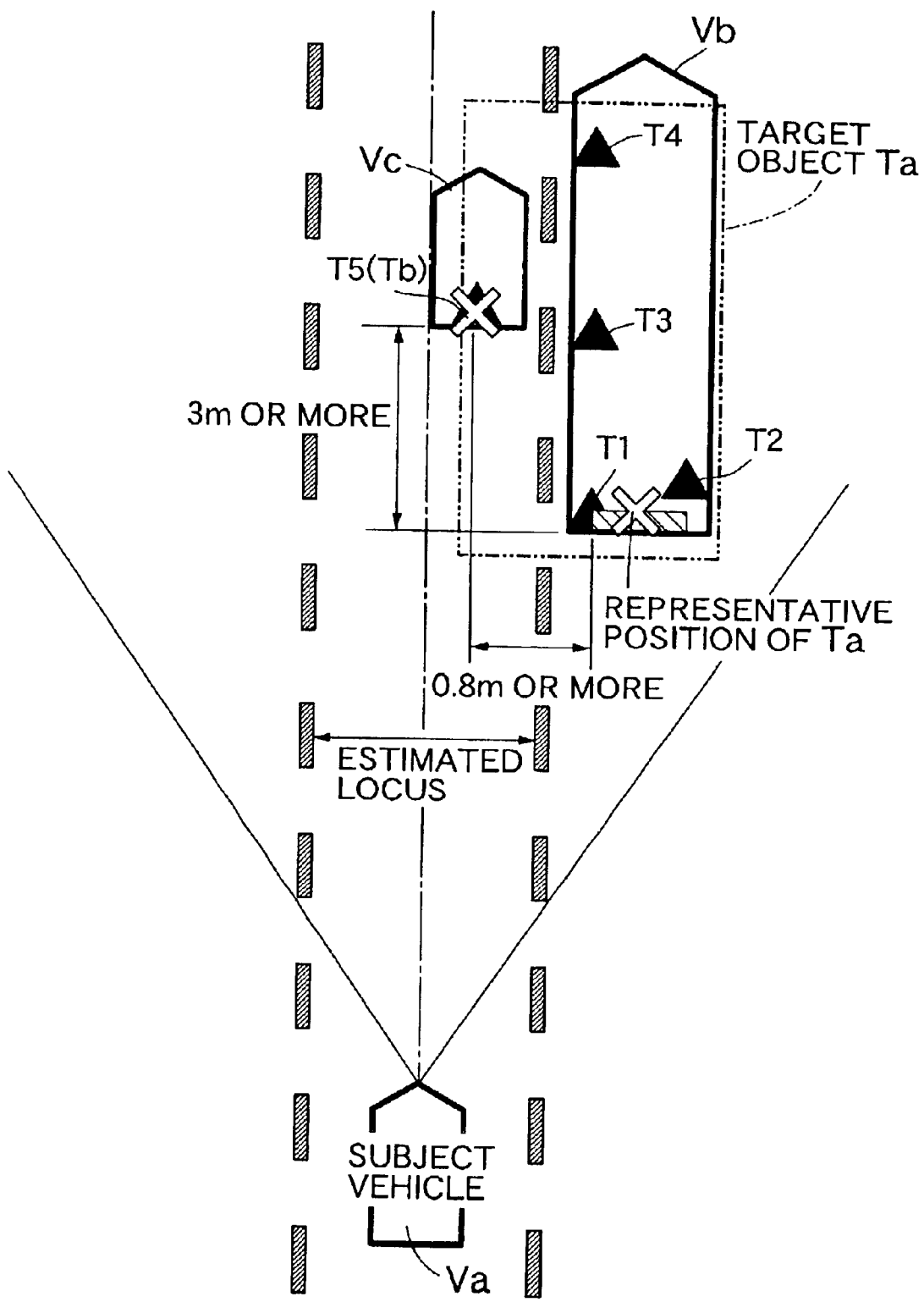
FIG. 7 is a schematic diagram illustrating a state in which the small-sized vehicle is separated from the large-sized vehicle.

As shown in FIGS. 5 to 7, assuming that a large-sized vehicle V, such as a carrier car, and a small-sized vehicle Vc, such as an automobile, are traveling side by side at the same speed ahead of the subject vehicle Va, the small-sized vehicle Vc is in a locus which is estimated from the vehicle speed and the yaw rate of the subject vehicle Va and which corresponds to a lane width resulting from the addition of predetermined distances, such as, for example only, 1.8 m, on left and right opposite sides of the center (indicated by a one-dot dashed line) of the estimated locus, and the large-sized vehicle Vb is out of the estimated locus. A plurality of vehicles are mounted on the large-sized vehicle Vb, which, for exemplary purposes, is a carrier car, and hence, the millimeter-wave radar system Sr detects a plurality of objects T1 to T4 from the large-sized vehicle Vb, detects an object T5 from the small-sized vehicle Vc, and detects any other vehicle (not shown) or the like as an object.

The plurality of objects T1 to T5 are detected in a predetermined region A, that is, for example only, 1.6 m wide on left and right opposite sides and 15 m long ahead of the subject vehicle, based on which one (in the example of FIG. 6 it is T1) of the objects T1 to T5 is closest to the subject vehicle Va. If the speeds of the plurality of objects T1 to T5 detected relative to the subject vehicle Va are equal, the plurality of objects T1 to T5 are united into and recognized as a single object Ta surrounded by a two-dot dashed line. If one object exists in a smaller region a, as shown in FIG. 5, having a longitudinal length of 3 m or less and in front of the predetermined region A, a representative position of the target object Ta is determined as a position of the one object. If a plurality of objects T1 and T2 exist in the smaller region a, as shown in FIG. 7, a central position (or a position of center of gravity) between the objects T1 and T2 is determined as a representative position. In this case, the representative position has a lateral width, with a left end point that is determined as the position of the leftmost one T1 of the objects T1 and T2 included in the smaller region a, and with a right end point that is determined as the position of the rightmost one T2 of the objects T1 and T2 included in the smaller region a.

As shown in FIG. 7, if one T5 of the united objects T1 to T5 exists in a region R (see FIG. 5) which is spaced forwards at a predetermined distance, for example only, 3 m, apart from the representative position, which is spaced leftwards (in a direction toward the estimated locus) at a first predetermined distance d1, for example only, 0.8 m or more from the representative position (a left end point of the representative position, if the representative position has a lateral width) included in the estimated locus of the subject vehicle, which is spaced forwards at a predetermined distance, for example, 50 m or less from the subject vehicle Va, and which is included the estimated locus of the subject vehicle Va, as shown in FIG. 7, such object T5 is determined as the small-sized vehicle Vc different from the large-sized vehicle Vb. Also, the target object Tb corresponding to the small-sized vehicle Vc is separated from the original target object Ta. If one object T5 exists in the region R, the position of such object T5 is determined as a representative position of the separated small-sized vehicle Vc. If a plurality of objects T5 exist in the region R, a central position (or a position of center of gravity) between the plurality of objects T5 is determined as a representative position. In this case, the representative position has a lateral width, whose left end point is a position of one of the objects included in the region R, which exists on a most left side, and whose right end point is a position of one of the objects included in the region R, which exists on a most right side.

In the above manner, the large-sized vehicle Vb, once united and erroneously identified as the single target object Ta, is accurately recognized by separating the object Ta into the large-sized vehicle Vb and the small-sized vehicle Vc. Therefore, either one of the alarm means 12 and the brake actuator 13 is properly operated once the small-sized vehicle Vc is determined to exist on the estimated locus of the subject vehicle Va.

In separating the small-sized vehicle Va from the large-sized vehicle Vb, the object T5 corresponding to the small-sized vehicle Va is separated from the objects T3 to T5 excluding the objects T1 and T2 existing in the smaller region a. Therefore, it is clear that the objects T1 and T2 existing in the smaller region a and used to specify the position of the large-sized vehicle Vb are separated, as is the small-sized vehicle Va, and thus an unnecessary separation step is avoided. This is because, if the object T5 is included in the smaller region a, the representative position of the target object Ta is determined as the central portion between the two objects T5 and T2 lying at the left and right opposite ends, and the left end point of such representative position is the position of the object T5. The position of the object T5 defining the left end point of the representative position is within the estimated locus and hence, if the contact damage alleviating control is carried out, a special or additional separating operation need not be carried out.

Additionally, in separating the small-sized vehicle Va from the large-sized vehicle Vb, there is made a condition wherein the small-sized vehicle Va deviates by the first predetermined distance (e.g., 0.8 m) toward the estimated locus of the subject vehicle Va from the object T1 defining the left end point of the representative position of the large-sized vehicle Vb. Therefore, it is possible to prevent a portion of the large-sized vehicle Vb from mistakenly being separated as the small-sized vehicle Vc.

Figure 8:
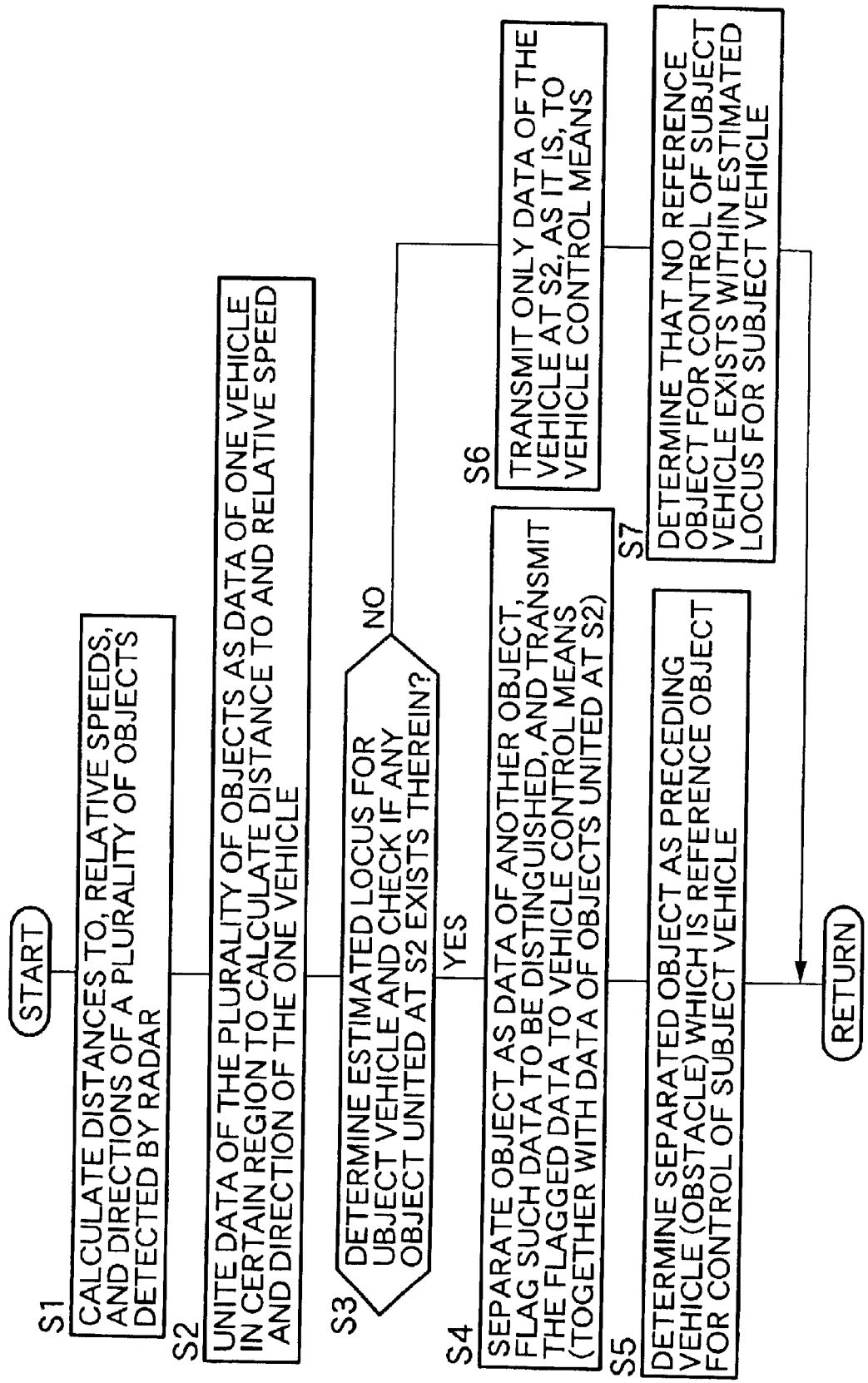
FIG. 8 is an operational flow chart.

A summary of the operation is shown in a flow chart of FIG. 8.

First, at Step 1, distances to, relative speeds, and directions of a plurality of objects detected by the millimeter-wave radar system Sr are calculated. At Step S2, the plurality of objects are united as data of a single vehicle (i.e., a target object) in a predetermined region, and a distance to, a relative speed, and a direction of the target object are calculated. At subsequent Step S3, a future locus for the subject vehicle is estimated based on a vehicle speed and a yaw rate of the subject vehicle, and it is determined whether any of the plurality of objects united at Step S2 exists within a width of the estimated locus. If the answer in Step S3 is YES, the object existing in the estimated locus is separated as a different target object at Step S4, and data thereof is flagged, so that it can be distinguished. At that time, the data of the original target object calculated at Step S2 is also output. At Step S5, the different target object separated is determined as an object which is a reference object (i.e., a preceding vehicle) for control of the subject vehicle, wherein the travel state of the subject vehicle is controlled. On the other hand, if the answer in Step S3 is NO, only the data of the original target object calculated at Step S2 is output, and it is determined at Step S7 that no reference object (i.e., preceding vehicle) for control of the subject vehicle exists in the estimated locus of the subject vehicle.

A second embodiment of the present invention will be described below with reference to FIGS. 1 and 9.

As shown in FIG. 4, a central processing unit (CPU) C in the second embodiment includes a re-separating means M4' in place of the separating means M4 provided in the first embodiment.

Figure 9:
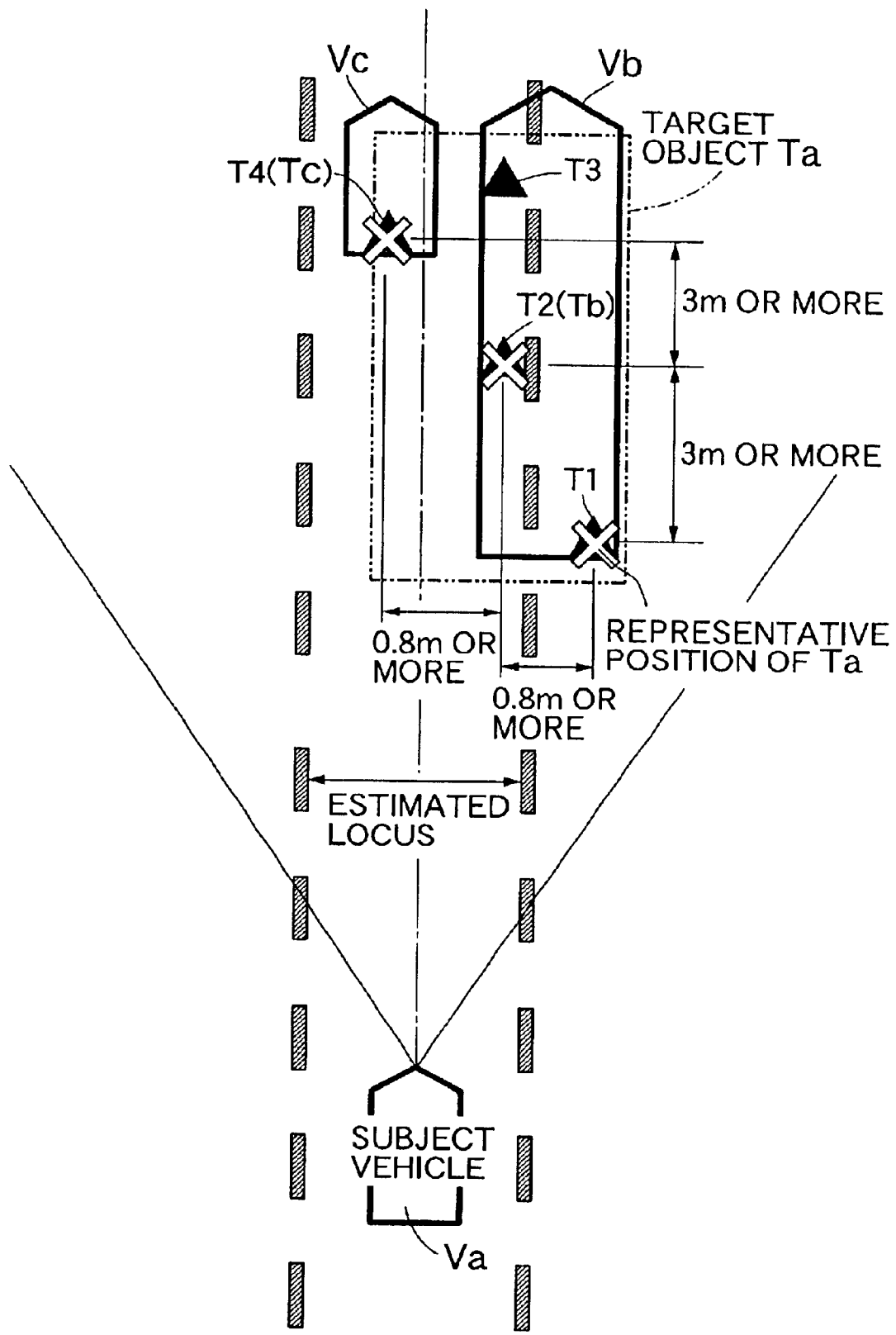
FIG. 9 is a schematic diagram illustrating a state in which a large-sized vehicle and a small-sized vehicle traveling side by side in front of a subject vehicle are united into a single target vehicle according to a second embodiment of the present invention.

As shown in FIG. 9, four objects T1 to T4 existing in a predetermined region A (see FIG. 5) have a longitudinal length, such as, for example only, 15 m, and a lateral width, such as, for example only, 3.2 m, and are set based on one T1 of the objects T1 detected by the millimeter-wave radar system Sr, which is closest to the subject vehicle Va, and are united into a target object Ta. Only one object T1 (Ta) exists in a smaller region a (see FIG. 5) 3 m in front of the predetermined region A. Therefore, a position of the object T1 (Ta) is a representative position of the target object Ta. If objects T2, T4 exist in a region R (see FIG. 5) which is spaced forwards at a predetermined distance d1 (e.g., 3 m) or more apart from the representative position, which is spaced leftwards (i.e., in a direction toward the estimated locus) at a first predetermined distance d1 (e.g., 0.8 m) or more from the representative position, which is spaced forwards at a predetermined distance (e.g., 50 m) or less from the subject vehicle Va and which is included in the estimated locus of the subject vehicle Va, such objects T2, T5 are separated and regarded as target objects Tb, Tc different from the original target object Ta.

If an object T4 (Tc) exists in a region which is spaced laterally at a second predetermined distance d2 (e.g., 0.8 m) or more apart from the position of one T2 (Ta) of the two objects T2, T4 (Tb, Tc) separated that is closer to the subject vehicle and which is spaced forwards at a third predetermined distance (3 m in the embodiment) or more apart from the position of the object T2 (Ta), the object T4 (Tc) is re-separated from the object T2 (Tb). Namely, the separating operation is repeated twice, wherein the two target objects Tb and Tc independent from the original target object Ta are separated and each has a representative position. Among the three target objects Ta, Tb and Tc, the right two target objects Ta and Tb correspond to the large-sized vehicle Vb, but the left one target object Tc corresponds to the small-sized vehicle Vc. Therefore, the control of the vehicle is carried out based on two Ta and Tb of the three target objects Ta, Tb and Tc, which exist in the estimated locus, wherein the alarm means 12 or the brake actuator 13 is operated appropriately to alert the driver to the presence of or avoid both the large-sized vehicle Vb and the small-sized vehicle Vc.

Although the embodiments of the present invention have been described in detail, it will be understood that the present invention is not limited to the above-described embodiments, and various modifications in design may be made without departing from the spirit and scope of the invention defined in claims.

For example, the contact-damage alleviation aiding system has been illustrated as the vehicle control means M5 in the embodiments, but the vehicle control means M5 is not limited to the contact-damage alleviation aiding system. For example, an ACC system (also known as an adaptive cruise control system) may be used for controlling a vehicle so that if no preceding vehicle exists, the subject vehicle is caused to travel at a preset constant vehicle speed, and if a preceding vehicle exists, the subject vehicle is caused to travel with a constant distance to the preceding vehicle.

In addition, the millimeter-wave radar system Sr has been illustrated as the transmitting/receiving means in the embodiments, but other means such as a laser radar system and the like may be employed.

What is claimed is:

1. A travel control system for a vehicle, comprising:
   a transmitting/receiving means for transmitting an electromagnetic wave toward a predetermined region in a traveling direction of a subject vehicle and for receiving a wave reflected from an object in the predetermined region;
   an object's information calculating means for calculating a position of the object relative to the subject vehicle based on results of the wave transmission and reception by said transmitting/receiving means;
   a uniting means for uniting a plurality of objects into one target object based on at least positions of the plurality of objects when said plurality of objects are detected within the predetermined region;
   a locus estimating means for estimating a future travel locus of the subject vehicle;
   a vehicle control means for controlling the traveling state of the subject vehicle in accordance with the positional relationship between said target object and the subject vehicle when the target object united by said uniting means is within the estimated locus; and
   a separating means for separating said one target object into different target objects within and outside the locus estimated for the subject vehicle by the locus estimating means when the plurality of objects united by said uniting means are within and outside the estimated locus of the subject vehicle.

2. A travel control system for a vehicle according to claim 1, wherein said uniting means unites objects existing in the predetermined region that is established based on one of said plurality of objects.

3. A travel control system for a vehicle according to claim 1, further comprising a position outputting means for outputting a representative position of the one target object united by the uniting means based on the position of an object existing in a smaller region that is established in the predetermined region at a location closer to the subject vehicle.

4. A travel control system for a vehicle according to claim 2, further comprising a position outputting means for outputting a representative position of the one target object united by the uniting means based on the position of an object existing in a smaller region that is established in the predetermined region at a location closer to the subject vehicle.

5. A travel control system for a vehicle according to claim 3, wherein said position outputting means, when the plurality of objects exist in said smaller region, outputs a position central between positions of two of said plurality of objects which are located at laterally opposite ends of said smaller region, as said representative position.

6. A travel control system for a vehicle according to claim 5, wherein said separating means, when at least one of the plurality of objects is within said predetermined region excluding said smaller region and within said estimated locus, separates said at least one object as a target object.

7. A travel control system for a vehicle according to claim 5, wherein said separating means separates, as a target object, an object existing at a distance equal to or larger than a first predetermined distance toward said estimated locus on the basis of one of the objects corresponding to the representative position, which is closest to said estimated locus.

8. A travel control system for a vehicle according to claim 3, wherein said separating means, when at least one of the plurality of objects exists within said predetermined region excluding said smaller region and within said estimated locus, separates said at least one object as a target object.

9. A travel control system for a vehicle according to claim 3, wherein said separating means separates, as a target object, an object existing at a distance equal to or larger than a first predetermined distance toward said estimated locus on the basis of one of the objects corresponding to the representative position, which is closest to said estimated locus.

10. A travel control system for a vehicle according to claim 9, wherein a re-separating means is substituted for said separating means and which is adapted, when two or more of said plurality of objects united by said uniting means exist within said estimated locus, to re-separate said objects spaced at a lateral distance equal to or larger than a second predetermined lateral distance apart from each other as a different target object.

11. A travel control system for a vehicle according to claim 9, wherein a re-separating means is substituted for said separating means and which is adapted, when two or more of the plurality of objects united by the uniting means exist within the estimated locus, to re-separate the objects spaced at a longitudinal distance equal to or larger than a third predetermined distance apart from each other as a different target object.

12. A travel control system for a vehicle according to claim 4, wherein said position outputting means, when the plurality of objects exist in said smaller region, outputs a position central between positions of two of said plurality of objects which are located at laterally opposite ends of said smaller region, as said representative position.

13. A travel control system for a vehicle according to claim 12, wherein said separating means, when at least one of said plurality of objects is within said predetermined region excluding said smaller region and within said estimated locus, separates said at least one object as a target object.

14. A travel control system for a vehicle according to claim 12, wherein said separating means separates, as a target object, an object existing at a distance equal to or larger than a first predetermined distance toward said estimated locus on the basis of one of the objects corresponding to the representative position, which is closest to said estimated locus.

15. A travel control system for a vehicle according to claim 4, wherein said separating means, when at least one of said plurality of objects is within said predetermined region excluding said smaller region and within said estimated locus, separates said at least one object as a target object.

16. A travel control system for a vehicle according to claim 4, wherein said separating means separates, as a target object, an object existing at a distance equal to or larger than a first predetermined distance toward said estimated locus on the basis of one of the objects corresponding to said representative position, which is closest to said estimated locus.

17. A travel control system for a vehicle according to claim 16, wherein a re-separating means is substituted for said separating means and which is adapted, when two or more of said plurality of objects united by said uniting means exist within said estimated locus, to re-separate said objects spaced at a lateral distance equal to or larger than a second predetermined lateral distance apart from each other as a different target object.

18. A travel control system for a vehicle according to claim 16, wherein a re-separating means is substituted for said separating means and which is adapted, when two or more of said plurality of objects united by the uniting means exist within said estimated locus, to re-separate said objects spaced at a longitudinal distance equal to or larger than a third predetermined distance apart from each other as a different target object.

* * * * *